May 7, 1957
J. D. WILCOX
2,791,373
SAFETY GUARD FOR ELECTRIC FANS
Filed March 16, 1956
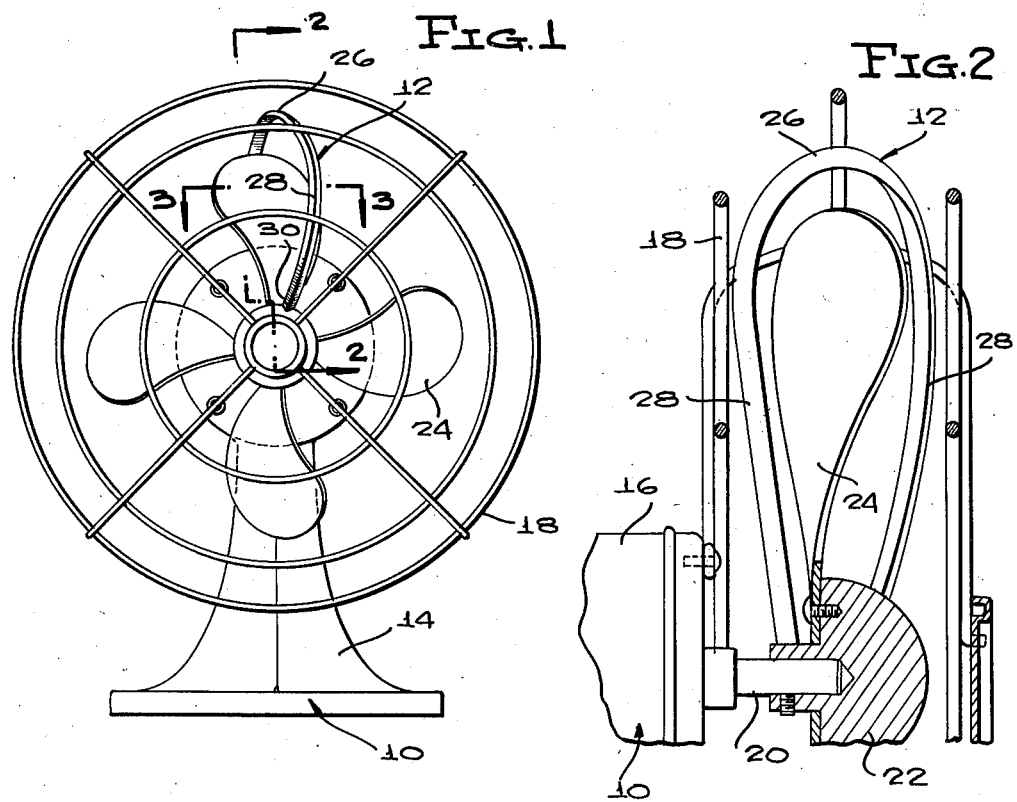
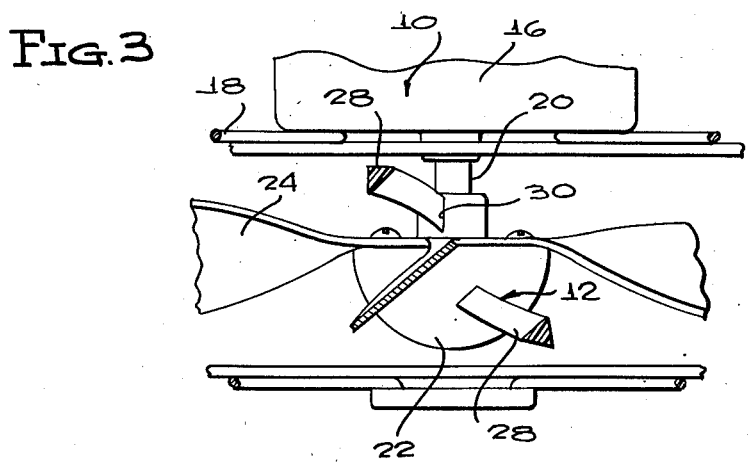
INVENTOR.
JOHN D. WILCOX
BY
McMorrow, Berman & Davidson
ATTORNEYS

United States Patent Office 2,791,373
Patented May 7, 1957

2,791,373

SAFETY GUARD FOR ELECTRIC FANS

John D. Wilcox, Tampa, Fla.

Application March 16, 1956, Serial No. 572,102

4 Claims. (Cl. 230—275)

This invention relates to a safety guard for electric fans and summarized briefly, comprises one or more flexible, elongated elements anchored at opposite ends thereof to the hub of the fan in position such as to contact one's finger or fingers or clothes, before they can be moved into the path within which the fan blades are traveling, thus to deflect the inserted object away from the fan blades.

It is not uncommon for injury to result from accidental movement of one's hand or clothes into the path of the blades of an electric fan. Under these circumstances, it is desirable to provide means for preventing such injuries and the present invention is intended to accomplish this.

Among important objects of the invention, there are the following:

To provide an inexpensive guard for fans that can be manufactured at low cost;

To permit the guard to be incorporated in a fan construction with a minimum of modification and redesign of the fan;

To form the guard in such a manner that it will not interfere with normal operation of the fan; and To provide an efficiently acting guard that will operate properly to deflect objects from the fan regardless of the direction from which said objects move toward the fan.

Other objects will appear from the following description, the claims appended thereto, and from the annexed drawing, in which like reference characters designate like parts throughout the several views, and wherein:

Figure 1 is a front elevation of a fan formed according to the present invention;

Figure 2 is an enlarged section on line 2—2 of Figure 1; and

Figure 3 is an enlarged section on line 3—3 of Figure 1.

A conventional electric fan 10 is shown, in association with a guard 12 formed according to the invention. The fan includes the usual base 14, motor 16, protective grill 18, shaft 20, hub 22 and blades 24 radiating from the hub.

Guard 12 is formed from a length of flexible plastic or rubber having in the illustrated example (but not necessarily) a triangular cross sectional shape. Said length is flexed to a U shape to include a bight 26 extending transversely of the plane of rotation of the blades from one to the other side of said plane, and legs 28 extending from the ends of the bight. One leg is fixedly secured to the hub in front of the series of blades and the other is fixedly secured to the hub in back of said series.

The guard thus straddles the blade series, rotating therewith during operation of the fan, and an object inserted through the protective grill from any direction will be immediately deflected away from the path of the blades by the bight or one of the legs of the guard.

If desired, there can be two of the guards, located diametrically opposite each other on the fan, to insure a proper balance of the rotating hub, blades, and guards. Any balanced arrangement, in fact, including two, three, or more than three guards may be employed. Further, any desired method of fixed connection of the ends of a guard to the rotating blade assembly may be used.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. The combination with an electric fan having a rotating hub, and blades radiating from said hub, of a protective guard comprising a flexible element spaced from said blades and connected to said hub to rotate therewith and positioned to deflect from the blades an object moved toward said blades, said element being approximately U shaped and straddling at least one of said blades.

2. The combination with an electric fan having a rotating hub, and blades radiating from said hub, of a protective guard comprising a flexible element spaced from said blades and connected to said hub to rotate therewith and positioned to deflect from the blades an object moved toward said blades, said element being approximately U shaped and straddling at least one of said blades, said element including a bight spaced radially outwardly from the periphery of the blades.

3. The combination with an electric fan having a rotating hub, and blades radiating from said hub, of a protective guard comprising a flexible element spaced from said blades and connected to said hub to rotate therewith and positioned to deflect from the blades an object moved toward said blades, said element being approximately U shaped and straddling at least one of said blades, said element including a bight spaced radially outwardly from the periphery of the blade, and legs, one spaced from the blade in front of the same and the other spaced from the blade in back of the same.

4. The combination with an electric fan having a rotating hub, and blades radiating from said hub, of a protective guard comprising a flexible element spaced from said blades and connected to said hub to rotate therewith and positioned to deflect from the blades an object moved toward said blades, said element being approximately U shaped and straddling at least one of said blades, said element including a bight spaced radially outwardly from the periphery of the blade, and legs, one spaced from the blade in front of the same and the other spaced from the blade in back of the same, the ends of said element being secured to said hub.

References Cited in the file of this patent

UNITED STATES PATENTS

| | | |
|---|---|---|
| 200,951 | Tragheim | Mar. 5, 1878 |
| 759,951 | Winch | May 17, 1904 |
| 1,868,113 | Ljungstrom | July 19, 1932 |